United States Patent
Rothenaicher (10) Patent No.: US 11,221,104 B2
(45) Date of Patent: Jan. 11, 2022

(54) SAFETY DEVICE FOR A MACHINE AND OPERATING METHOD

(71) Applicant: Q-tec Pruefgeraete GmbH, Zeilarn (DE)

(72) Inventor: Otto Rothenaicher, Zeilarn (DE)

(73) Assignee: Q-tec Pruefgeraete GmbH, Zeilarn (DE)

(*) Notice: Subject to any disclaimer, the term of this patent is extended or adjusted under 35 U.S.C. 154(b) by 162 days.

(21) Appl. No.: 16/783,673

(22) Filed: Feb. 6, 2020

(65) Prior Publication Data

US 2020/0256511 A1    Aug. 13, 2020

(51) Int. Cl.
| | |
|---|---|
| *F16P 3/14* | (2006.01) |
| *B23Q 11/00* | (2006.01) |
| *B23Q 17/24* | (2006.01) |
| *F16P 3/00* | (2006.01) |
| *F16P 3/20* | (2006.01) |

(52) U.S. Cl.
CPC ......... *F16P 3/144* (2013.01); *B23Q 11/0082* (2013.01); *B23Q 17/2438* (2013.01); *F16P 3/003* (2013.01); *F16P 3/147* (2013.01); *F16P 3/20* (2013.01)

(58) Field of Classification Search
CPC .. F16P 3/144; F16P 3/003; F16P 3/147; F16P 3/20; B23Q 11/0082; B23Q 17/2438
See application file for complete search history.

(56) References Cited

U.S. PATENT DOCUMENTS

| | | | |
|---|---|---|---|
| 5,921,367 A | 7/1999 | Kashioka et al. | |
| 7,924,164 B1* | 4/2011 | Staerzl | F16P 3/142 340/573.1 |
| 8,311,661 B2* | 11/2012 | Krapf | B23D 59/001 700/174 |

(Continued)

FOREIGN PATENT DOCUMENTS

| | | |
|---|---|---|
| DE | 3937684 A1 | 5/1991 |
| DE | 19716035 A1 | 10/1998 |

(Continued)

OTHER PUBLICATIONS

Siemens AG; "Zugangsüberwachung durch einen Lichtvorhang mit Zweihandbedienung und Not-Halt bis SIL 3 bzw. PL e mit einem Sicherheitsschaltgerät 3SK2"; Sep. 19, 2016.

(Continued)

*Primary Examiner* — Sisay Yacob
(74) *Attorney, Agent, or Firm* — Fitch, Even, Tabin & Flannery LLP (57) ABSTRACT

Production and work machines are to be able to be more safely operated. Thereto, they can be equipped with a safety device, which comprises a light curtain, a first and a second reflection device, which are each formed for reflecting light of the light curtain, and a first identification element integrated in the first reflection device as well as a second identification element integrated in the second reflection device. Moreover, the safety device comprises a first sensor device and a second sensor device for reading out the identification elements. A control device provides a start signal for the machine only if the first sensor device reads out the first identification information and the second sensor device reads out the second identification information at the same time.

16 Claims, 4 Drawing Sheets

(56) References Cited

U.S. PATENT DOCUMENTS

| | | |
|---|---|---|
| 2006/0096425 A1 | 5/2006 | Keller |
| 2006/0101960 A1* | 5/2006 | Smith ................... F16P 3/144 83/58 |
| 2010/0057244 A1* | 3/2010 | Krapf ................ B23Q 17/2438 700/177 |
| 2014/0130645 A1 | 5/2014 | Takano et al. |

FOREIGN PATENT DOCUMENTS

| | | |
|---|---|---|
| DE | 19829773 A1 | 1/2000 |
| DE | 102007041098 A1 | 3/2008 |
| EP | 1905573 A1 | 4/2008 |
| EP | 1905573 B1 | 9/2015 |
| JP | S5912742 A | 1/1984 |
| WO | 2011117061 A1 | 9/2011 |

OTHER PUBLICATIONS

EPO; App. No. 20 154 696.7; European Search Report dated Jun. 30, 2020.

* cited by examiner

SAFETY DEVICE FOR A MACHINE AND OPERATING METHOD

CROSS-REFERENCE TO RELATED APPLICATIONS

This application claims priority to German Patent Application No. 10 2019 103 523.6, filed Feb. 12, 2019, which is incorporated by reference in its entirety herein.

FIELD

The present invention relates to a safety device for a machine. In particular, the safety device is formed as a non-contact protection device. Moreover, the present invention relates to a corresponding method for safely operating a machine.

BACKGROUND

There are still machines and plants, which require manual operation and thereby represent a considerable danger to the operator. They are in particular machines like mixing rolling mills, crushing plants, presses etc. with manual supply (feed) and handling, respectively, of the processing products at the dangerous spot, which cannot be protected by manual protection elements and measuring sensors.

The currently used systems only offer an insufficient protection for the operator since the protection elements cannot differentiate between product and elements to be protected such as hands of operators. In addition, they often exacerbate the operation since the protection space does not have an exactly delimited and visible trigger area (radiometric sensor system, Theremin oscillator etc.). In order that the work area at the machine (e.g. rolling mill) is restricted as little as possible and a false trigger is avoided, an exact trigger point visible to the operator is required in the entire access area. False triggers partially result in considerable operational disruptions and/or product damages.

In known plants, the draw-in locations are currently mechanically protected by covers as far as possible. In the non-coverable areas, emergency stop elements like switches, brackets, cable controls and knee switch mats, respectively, are positioned in reaching or operation proximity. Heretofore, an absolute intervention protection is not given with these elements.

At rolling mills, an intervention protection is partially realized by a reflection light curtain, which is triggered by reflection bracelets and reflection surfaces on the hands, respectively. This safety device is specifically mounted on the respective plants and triggers upon activation at this place. It is the prerequisite that the operator puts on the required reflection elements at the places to be protected. The plant can only be put into operation if the function of the intervention protection has been tested.

As a further non-contact intervention safeguard, e.g. a Theremin oscillator (DE 197 16 035 A1) in connection with a circular saw is mentioned. The position of the intersecting line is indicated by a laser. Here, the position of the trigger point is not recognizable for the operator.

A UWB radar sensor for recognizing human tissue with indication of a monitoring area represents an alternative (DE 10 2007 041 098 A1). Here too, an exact spatial association of trigger point and indication area is not given. Accordingly, false triggers have to be expected.

At rolling mills, the monitoring of the intervention area by transponders (electromagnetic field) is known (US 2014/0130645 A1, DE 39 37 684 A1). Here too, adaptation and indication of the trigger field are not possible and thereby it restricts the operation. The operator only has an assumption where the trigger field extends. It is essential that the operator recognizes the position of the trigger element to the protection barrier before triggering the shutoff alarm to avoid false triggers and allow simple safe handling.

Corresponding to the printed matter US 2006/0101960 A1, it is examined if an object is present in the protection field. However, if it is detected in the protection field, it is too late for a reaction of the operator.

Further, the monitoring of the correct application of adequate work protection elements via commercial high-frequency transponders is known (DE 198 29 773 A1, EP 1 905 573 B1). Monitoring of the functionality of the work protection elements is not effected by the examination unit.

A security device with the aid of electrostatic or light projectors, which are able to emit and capture light, is described in U.S. Pat. No. 5,921,367. In this device too, an intervention warning effected before the actual intervention is not possible.

In JP S59-12 742 A, a method for the safety device of a work machine is described. In order to ensure the safety of the worker, a method is used, in which light from a reflecting plate attached to an accessory of the worker is recognized by a light receiver, and as soon as a work part of the worker penetrates the range of the receiver, the work machine immediately stops.

A system and a method for fast stopping a circular bench saw are described in US 2006/0096425 A1. The application describes a method for recognizing the hand of the user in a predefined area to stop the saw blade upon recognition of the hand.

WO 2011/117061 A1 describes a method for monitoring the attention state of an operator of a production device. By monitoring the degree of attention of employees, states of fatigue can be early recognized and corresponding dangers can be avoided.

SUMMARY

Thus, the object of the present invention is in being able to more safely configure the operation of a machine.

According to the invention, this object is solved by a safety device for a machine, a machine with such a safety device and a method for operating a machine corresponding to the independent claims. Advantageous developments of the invention result from the dependent claims.

Accordingly, according to the invention, in one form, there is provided a safety device for a machine comprising
a light curtain,
a first and a second reflection device, which are each formed for reflecting light of the light curtain,
a first identification element integrated in the first reflection device and a second identification element integrated in the second reflection device,
a first sensor device for reading first identification information of the first identification element out of the first reflection device,
a second sensor device for reading second identification information of the second identification element out of the second reflection device, and
a control device for providing a start signal for the machine only if the first sensor device reads out the first identification information and the second sensor device reads out the second identification information at the same time, as well as for providing a stop signal for the machine as soon as the light curtain detects its light reflected by one of the reflection devices.

In particular, the safety device is to serve as a non-contact protection device, e.g. for personal protection or intervention protection at dangerous spots at machines and plants. A light curtain is to serve for the non-contact protection, which is typically realized of a plurality of reflection light barriers arranged linearly next to each other. In addition, a first and a second reflection device belong to the safety device, which are in particular provided for the two arms of an operator. They are specially adapted to the light of the light curtain. Preferably, a reflection as high as possible is to be achieved by them. Beneficially, they are also capable of reflecting the light in as many directions as possible.

Moreover, it is provided that the safety device comprises a first identification element and a second identification element. The first identification element is integrated in the first reflection device and the second identification element is integrated in the second reflection device. These identification elements carry identification information such that the reflection devices can be more or less exactly identified. Optionally, the identification elements and identification information, respectively, can also be different in order that the two reflection devices can be differentiated from each other.

The safety device comprises corresponding sensor devices. A first sensor device serves for reading the first identification information of the first identification element out of the first reflection device. Similarly, the second sensor device serves for reading the second identification information of the second identification element out of the second reflection device. The two sensor devices can be of the same type. Reading out can in particular be effected in non-contact, namely inductive, capacitive, electromagnetic or optic manner. For example, the identification element can be a barcode or a QR code, which can be optically read.

Moreover, the safety device comprises a control device for providing a start signal and a stop signal for the machine. The start signal is only provided if the first sensor device reads out the first identification information and the second sensor device reads out the second identification information at the same time. Thus, the control device does not provide a start signal if the sensor devices cannot read identification information or if only one sensor device reads out identification information. It is important that both sensor devices each read out identification information at the same time in order that it can for example be ensured that an operator wears the two reflection devices at both arms at the same time. If he would wear the reflection device only at one arm, thus, the danger would be great that he injures himself at the machine with the other arm.

Moreover, the control device is adapted to provide a stop signal for the machine as soon as the light curtain detects the light reflected by one of the reflection devices (in the present document, "detect light" means that the intensity of the light has to exceed a preset threshold in order that it can be detected). Thus, if the light of the light curtain is reflected back to one or more receivers of the light curtain by at least one of the reflection devices, this means that the concerned reflection device has penetrated into the monitored area of the light curtain. Thereby, there is danger of injury and the machine should be immediately stopped. Therefore, a corresponding stop signal is generated by the control device.

Advantageously, the machine can thus be very safely operated by the safety device. On the one hand, it is only started if two preset reflection devices are used and identified. On the other hand, it can be securely shut off if one of these identified reflection devices immerges in the area protected by the light curtain.

In an advantageous configuration, it is provided that the start signal is only provided by the control device if the first and the second identification information each correspond to preset reference information. This is equal to an increase of the safety requirement with respect to the case that only the presence of any reflection devices is examined. Corresponding to this increased safety requirement, it can be dictated that only very specific reflection devices are allowed to be used in context of the machine. This inversely means that also only one or more preset types of machines can be operated with certain reflection devices. For example, preset reflection devices can be used for one roller type, but not for another roller type. Moreover, it can also be provided that certain reflection devices can for example be used for a roller, but not for a press. Thus, the safety in operating machines can be correspondingly kept high specific to machine.

Corresponding to a further configuration of the safety device, a line laser device is oriented parallel to the light curtain with its beam direction. Preferably, the line laser device is oriented such that a laser line marks an edge of the light curtain. The line laser device radiates light in the optically visible range. In this manner, the operator can easily recognize the beginning of the area monitored by the light curtain (safety area).

In a further configuration, it is provided that the first and the second reflection device are each formed for wearing at a limb of an operator of the machine. In particular, the reflection devices can be worn at the hands, arms, legs or feet of the operator. Hereby, it is possible that these limbs of the operator are protected from the machine. In particular, the hands are usually to be protected from intervention in the machine. Insofar, it is important that the reflection device is as light as possible and does not impede the operator in his work. Moreover, the reflection devices either should not be unduly voluminous.

Preferably, the reflection devices are each formed as a glove, finger ring or bracelet. Thus, they can for example be realized as a textile fabric with a reflective layer or a reflective foil. Such "wearables" can be easily worn and usually do not impede the operator. In the present case, the operator then for example has to wear the gloves at both hands or the bracelets at both arms.

Additional safety can be achieved in that it is examined if the gloves or bracelets or finger rings are actually worn. For this reason, it can be provided that each glove or each bracelet or each finger ring is each equipped with an expansion sensor or tension sensor, the signals of which are also a necessary condition for the control device in order that the start signal is provided. Namely, only if the glove or the bracelet is worn, the glove or the bracelet correspondingly expands and thereby also the integrated expansion or tension sensor. Alternatively, a pulse tracker or vein detector can also be integrated in the glove or the bracelet. Accordingly, a corresponding sensor signal results in wearing the glove or bracelet, which can be evaluated by the control device. Thus, it is not sufficient to simply hold the gloves or the bracelets on the respective sensor devices and then continue to work without these textiles. Rather, they actually have to be worn. Thus, the control device only provides a start signal if the gloves or bracelets are detected at the sensor devices at the same time and the corresponding expansion or tension signals of the control device are additionally present.

Corresponding to a further embodiment of the present invention, it can be provided that the light curtain is realized by infrared technology and the reflection devices are adapted thereto. In this case, the light curtain comprises a bar with infrared reflection light barriers. Infrared light is emitted by the linearly arranged transmitters and reflected light is detected by the infrared receivers. Infrared light is very well suitable because it is little reflected by many materials, but all the more by reflection devices, which are specially configured for the infrared light. Especially, gloves or bracelets can be provided with materials, which reflect infrared light to high extent. Thus, it can be recognized with great certainty if such a reflection device for example moves into the light curtain.

Furthermore, the safety device can be formed such that a third sensor device for examining a reflecting capacity of the first reflection device is arranged immediately next to the first sensor device and a fourth sensor device for examining a reflecting capacity of the second reflection device is arranged immediately next to the second sensor device. In particular, the third and the fourth sensor device can thus for example determine that the reflectance of a reflection glove has decreased due to contamination or ageing. In this case, the safety can be increased in that the machine is not switched on if the operator wears these contaminated or aged reflection gloves. Thus, there is not only examined the identity of the reflection devices, but also the quality thereof with respect to their reflectance at the same time. Especially in the infrared range, the examination of the reflecting capacity can only be affected by machine anyway. The first and the third sensor device can be integrated in a common housing. Similarly, the second and the fourth sensor device can also be integrated in a further common housing.

Moreover, the safety device can be further developed in that the first sensor device, the second sensor device, the first identification element and the second identification element are based on RFID technology. A reliable, non-contact identification can be performed with the RFID technology. The respective sensor device initiates the concerned identification element by an electromagnetic pulse in order that it electromagnetically sends back the own identification information.

In an optional configuration, it is provided that each detection event of the light curtain is countable by the control device and a corresponding counting result is taken into account in providing the start signal. Thus, each event is for example counted if a reflection bracelet is detected by the light curtain. In this manner, it can be ensured that the reflection bracelet is not arbitrarily long used. Thus, it would not be necessarily required to specifically examine the reflectance of the reflection bracelet. Rather, one assumes in this case that the reflection bracelet and the corresponding reflection device, respectively, can be safely used in a preset number of employments. With more employments, uncertainties could occur due to ageing or contamination.

According to the invention, a machine can also be provided, which comprises one of the above mentioned safety devices. Therein, a protection area of the machine is provided by the light curtain. Thus, the machine can be safely operated by means of the reflection devices, the sensor devices and the control device.

Especially, the machine can have arranged the first and the second sensor device such that they are at least 20 cm, preferably at least 50 cm apart from each other. For example, the two sensor devices are 80 cm or 1 m apart from each other such that an operator wearing the reflection gloves as the reflection devices can comfortably hold them on the sensor devices wearing at both hands to the left and right of the body. With this considerable spatial distance, it can be ensured that both sensor devices cannot detect or identify a single reflection device, e.g. a single reflection bracelet.

Further, it is beneficial if the protection area of the machine is indicated by a line laser with visible light on an operationally provided operator side. Since the light curtain is often constructed based on infrared light, it is not possible for the operator to recognize the protection area of the machine monitored by the light curtain without auxiliary means. However, if the machine is inadvertently switched off due to an intervention into the protection area, production downtimes and optionally also product damages occur. In order to obviate this, it is advantageous to exactly indicate the protection area. This is particularly well managed by a line laser if its line light extends parallel to the light curtain. Especially, the plane, which the laser light sweeps, should be approximately identical to the side of the light curtain, which faces the operator. Thus, the operator can recognize at all times and in particular also at each level where the light curtain extends. Optionally, the line light of the line laser also extends at a preset distance to the light curtain.

Especially, it can be provided that the machine is a rolling machine, a punching machine, a pressing machine or a machine tool. However, the machine can optionally also include any other work or production machine and in particular also a conveyor plant. Especially in work or production machines, which are immediately operated by an operator, it can be advantageous for safety reasons to implement the safety device according to the invention at the human-machine interface.

Corresponding to the present invention, in one form, the above mentioned object is also solved by a method for operating a machine by illuminating a border of a protection area of the machine with a light curtain, providing a first reflection device and a second reflection device, wherein a first identification element is integrated in the first reflection device and a second identification element is integrated in the second reflection device, reading first identification information of the first identification element out of the first reflection device by a first sensor device, reading second identification information of the second identification element out of the second reflection device by a second sensor device different from the first sensor device, detecting light of the light curtain after reflection on one of the reflection devices, and providing a start signal for the machine only if reading out the first identification information and reading out the second identification information are effected at the same time, and/or providing a stop signal for the machine as soon as the detection of the light is effected.

The advantages and possibilities of development mentioned in context of the safety device according to the invention and the corresponding machine, respectively, can also be realized in the method according to the invention in analogous manner. This means that the features of the safety device can be implemented as corresponding functional features of the method according to the invention.

BRIEF DESCRIPTION OF THE DRAWINGS

Now, the present invention is explained in more detail based on the attached drawings, which illustrate as follows.

The embodiments described in more detail below present preferred embodiments of the present invention.

DESCRIPTION OF THE PREFERRED EMBODIMENTS

Figure 1:
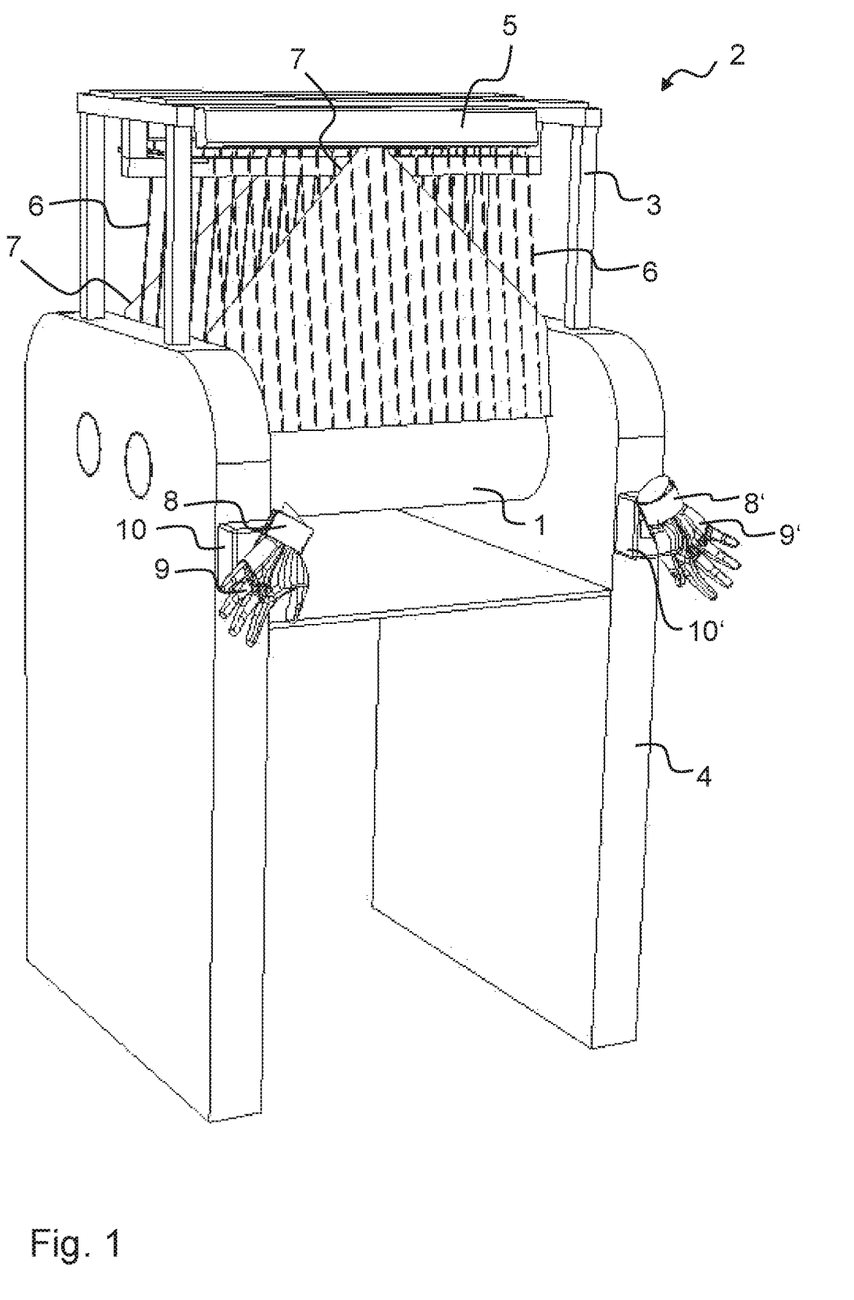
FIG. 1 shows a rolling machine with safety device in a start phase.

In the present case, the rolling machine illustrated in FIG. 1 comprises two rollers 1. An operator not illustrated can introduce rolling material from above between these rollers 1. In order that the operator and in particular his hands are not endangered, the rolling machine comprises a safety device 2. It is in particular located above the nip such that this area around the nip can be secured (safety area). The safety device 2 for example comprises a rack 3, which can be realized as a cuboid frame rack. The rack 3 is preferably arranged on a housing 4 of the rolling machine.

The safety device 2 comprises a light curtain 5, which can be attached to the rack 3, in particular parallel to the rollers 1. The light curtain 5 typically comprises a linear arrangement of numerous reflection light barriers. Beneficially, they are operated in the infrared range of the light. The light sources of these reflection light barriers preferably provide parallel light beams 6 in the switched-on state, which diverge as little as possible. By the plurality of identical parallel linearly offset light beams 6, a curtain-like radiation field results. If a reflecting object gets into this curtain-like radiation field, the light is reflected back to one or more receivers of the light curtain 5 and a corresponding detection signal can be obtained. This detection signal can for example be used in a control device, which can be integrated in the housing 4 of the rolling machine, to switch off the rolling machine.

In the present example, the rolling machine also comprises a similar light curtain 5 at the rear roller (not visible in the figure) in FIG. 1, which also produces beams 6.

Since the light curtain is usually based on infrared technology, the radiation field cannot be perceived by the operator. For this reason, the safety device 2 is here additionally equipped with a line laser device, which can be integrated in the light curtain 5. This line laser device generates a laser radiation field 7 in the operation, which results in a laser line upon impinging on an object. Beneficially, this laser curtain, i.e. the laser radiation field 7, extends exactly parallel to the light curtain 5 with the beams 6. A similar laser curtain 7 can in turn be located on the rear side of the rolling machine if an operation of the rolling machine from the rear side is also possible.

Two reflection devices 8 and 8' also belong to the safety device 2, which here each have the shape of a bracelet. For guidance, the hands 9 and 9' of an operator are also drawn in FIG. 1 to better understand the wearing position of the reflection devices 8 and 8'. The reflection devices 8, 8' each comprise an identification element with identification information. The identification element is preferably an RFID element or else another, code carrying element such as for instance a QR code or barcode.

In addition, the safety device also comprises two sensor devices 10 and 10'. Here, both sensor devices are attached to the housing 4 of the rolling machine on the front operating side. The first sensor device 10 to a left leg of the housing 4 and the second sensor device 10' to a right leg of the housing 4. The first sensor device 10 can read first identification information of the first identification element out of the first reflection device 8 and the second reflection device 10' can read second identification information of the second identification element out of the second reflection device 8'. Only if both identification information are read out of the two reflection devices 8 and 8' at the same time, the control device of the machine and in particular of the rolling machine determines it such that the control device can generate a start signal for the machine. Thereby, the rollers 1 can begin to run. In this manner, it can be ensured that the operator wears the reflection devices 8 and 8', respectively, at the same time when he operates the machine.

Figure 2:
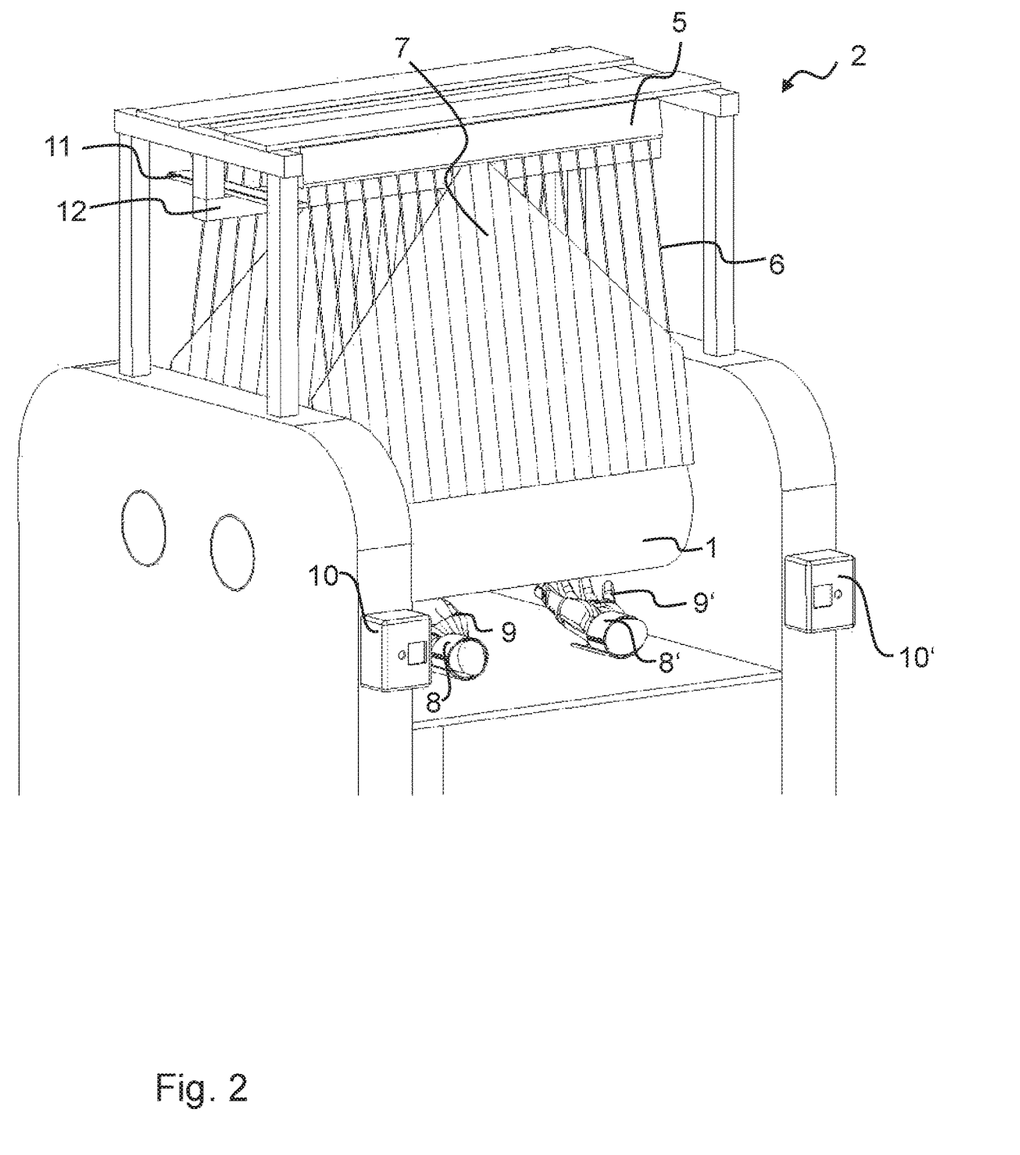
FIG. 2 shows a detailed view of the rolling machine in an operating phase.

FIG. 2 shows an operating phase of the rolling machine while it runs. The operator reaches below the roller 1, which is symbolized by the two hands 9 and 9'. This area below the roller 1 is uncritical and is therefore not monitored by the safety device 2 and the light curtain 5 with the beams 6, respectively. In this position, the operator can for example remove rolled material from the rolling machine.

In the present example, the safety device 2 comprises a plate-shaped reflector element 11 on a linear slide 12 extending parallel to the light curtains 5. The reflector element 11 is movable along the linear slide 12. It reflects the infrared light of the light curtain 5. Thereby, it can serve for examining the light curtain 5 before machine start.

Here, the light curtain and its beam field with the beams 6, respectively, are slightly outwards inclined. However, the orientation of the light curtain 5 can be arbitrarily chosen. Optionally, it can also be perpendicular or inwards inclined. However, it is of particular advantage if the line laser or laser beam field 7 extends as parallel to the beam field of the light curtain 5 as possible. Thereby, the visible light of the laser beam field 7 can always indicate the position of the beam field of the light curtain 5 inherently invisible to the operator.

The sensor devices 10, 10' can each be combined sensor devices (first and third sensor devices and second and fourth sensor devices, respectively), by which not only the respective identification information of the reflection devices 8, 8' is read out, but also the reflecting capacities (intensity of a reflected signal) of the reflection devices 8, 8' can be measured. In FIG. 2, this combined sensor system is indicated in that each housing of the sensor devices 10, 10' comprises two windows.

Figure 3:
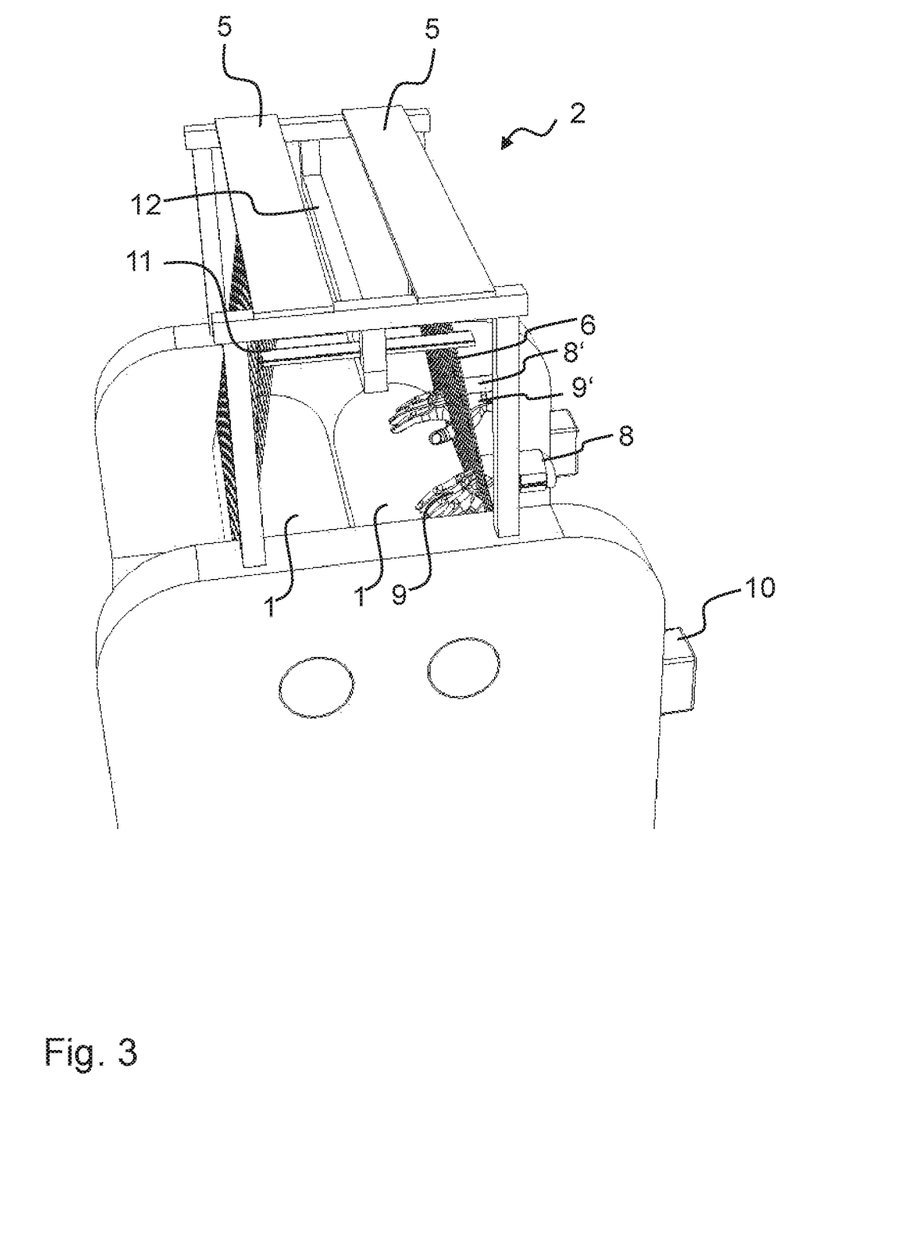
FIG. 3 shows a detailed view of the rolling machine in another operating phase.

FIG. 3 shows a further operating phase of the rolling machine. Here, the operator has to reach into a safety area above the rollers 1 to for example insert a billet into the rolling machine. The safety area is bounded to the bottom by the rollers 1 and laterally by the beam fields of the light curtains 5, which are indicated by the beams 6. As is apparent from FIG. 3, the fingers of the operator already reach through the beam field of the light curtain 5. However, this is still an uncritical situation since the fingers cannot yet be captured by the rollers 1. The fingers and the hands of the operator, respectively, barely reflect the infrared light such that the light curtain 5 does not respond to the penetration of the fingers through the beam field. However, the operator here respectively wears bracelets 8 and 8', respectively, at the wrists. They distinctively reflect the infrared light such that the light curtain 5 would register the penetration thereof into the safety area. In order that the operator can better recognize when the bracelets 8, 8' reach the safety area and the beam field of the light curtain 5, respectively, the line laser (line laser field 7; cf. FIGS. 1 and 2) not drawn in FIG.

3 marks the penetration edge of the hands 9, 9' through the beam field of the light curtain 5.

Figure 4:
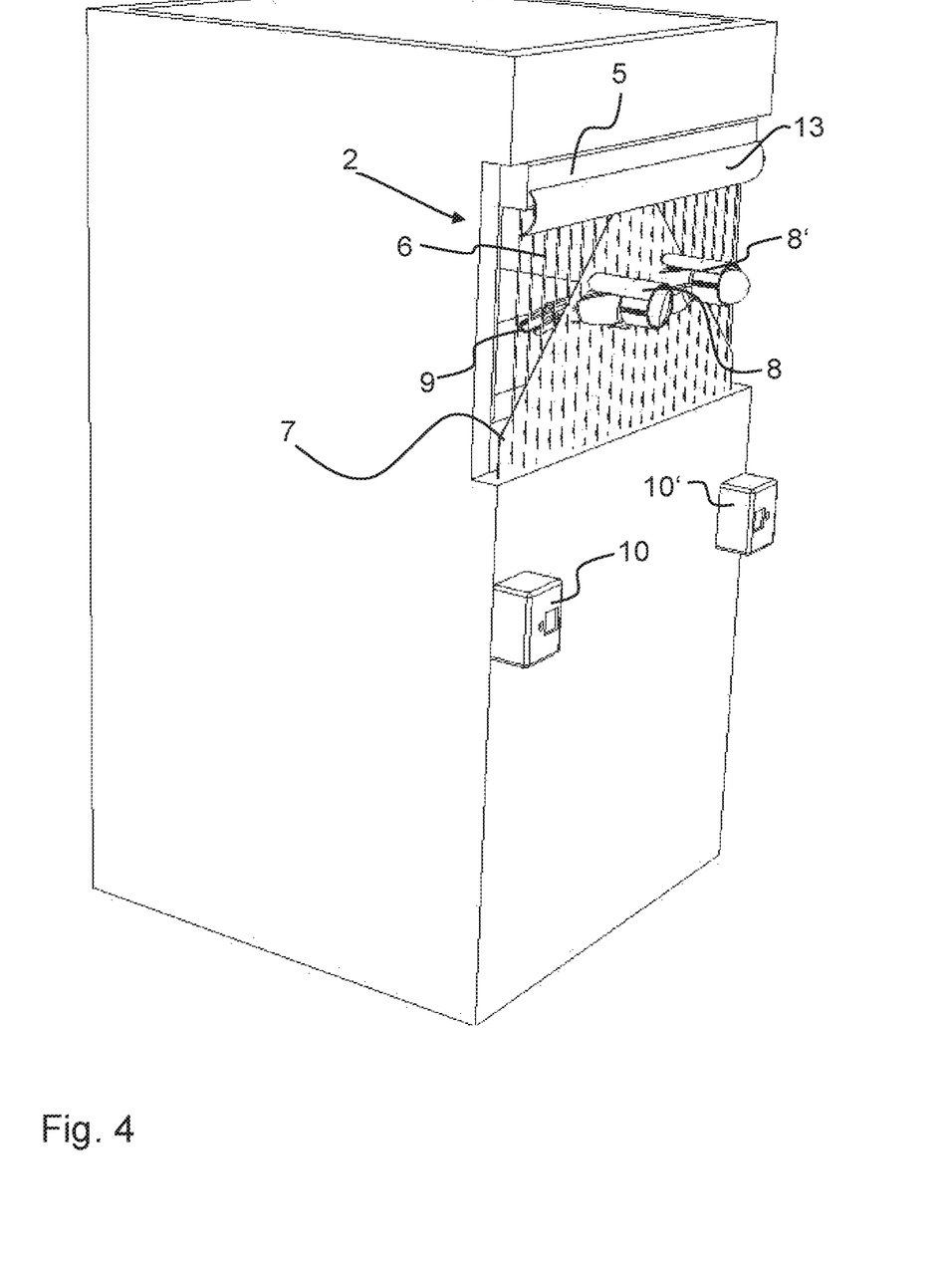
FIG. 4 shows a punching machine with safety device according to the invention.

FIG. 4 shows a further embodiment for the safety device 2 according to the invention. Here, it is integrated in a press or pressing machine, in particular on the operating portal thereof. The operating portal is "closed" by the light curtain 5 with its beams 6. Here, the curtain-like line laser field 7 also extends parallel to the radiation field of the light curtain 5. Both fields are preferably again congruent such that the line laser field 7 optically indicates the radiation field of the light curtain 5. If the operator reaches into the light curtain 5 with his hands 9 without the infrared light reflecting reflection bracelets 8, 8' penetrating into the light curtain 5, thus, the press continues to run. Otherwise, when the reflection devices or reflection bracelets 8, 8' penetrate into the light curtain 5, the press immediately stops. For examining the functionality of the light curtain, the safety device here comprises a foldable reflection element 13. With folded reflection element, all of the reflection light barriers of the light curtain 5 can be examined at the beginning of the operation.

Thus, corresponding to the present invention, an intervention protection based on an invisible reflection light curtain can be provided in a specific embodiment, which avoids unintended trigger by the not securely recognizable trigger area of the protection field or protection area and ensures the correct use of the trigger elements like reflection bracelets, reflection gloves etc. (reflection devices). The visibility of the protection or trigger area is realized by the integration of a line laser with a laser projection line, which extends identically to the trigger function of the light curtain. The maximum deviation is for example only few millimeters (e.g. 5 mm or 1 mm ranges according to demand) over the entire monitoring field.

Since the light curtain is positioned such that an intervention is allowed up to a certain value (distance to the dangerous spot) through the light curtain according to requirement, the reflection area of the reflection device is attached with an allowed offset to the fingertips. This offset to the fingertips (positioning at the arm, back of the hand, partial area of the fingers etc.) can be better visualized by the laser projection line of the line laser beginning at the fingertips or the supplied materials (billet etc.). The operator has the control over the position to the trigger barrier, which was not possible in previous protection devices. This results in a substantially more operator-friendly function of this safety device with avoidance of unintended stops of the machines at the same time.

In order to guarantee the functional safety, it has to be ensured that the suitable reflection elements or reflection devices are used. This is realized by the two sensor devices, which are positioned with corresponding distance to each other. Thereto, the reflection devices are provided e.g. with RFID transponders. At the same time, the reflection capacities of the reflection devices can be examined by further or augmented sensor devices at the same sensor locations. This allows the control both of the use of the correct protection elements and the examination of the functionality of these protection elements.

In order to release the machine, the reflection elements have to be recognized by the sensor devices at the same time. Therein, this function corresponds to a two-hand control device with two switching elements to be operated at the same time. Monitoring if the reflection devices are also correctly used, can be realized by the use of expansion and tension sensors or pulse tracker and vein detector, respectively, or the like.

By the reflection devices specially worn at the body (hands) in this embodiment as the trigger elements, which are additionally monitored and controlled, high safety for dangerous machines like rolling mills can be ensured. Simple and safe work can be allowed in the danger area and inadvertent downtimes of the machines are reduced.

In the following, a specific solution is presented in more detail. The safety device includes a complete safety concept, which avoids false triggers by the handling as possible and excludes operating errors by false or non-functioning reflection protection elements (reflection devices).

The position of the protection area in or at the machine is determined by the manual operating requirements of the machine. This position is set in a defined distance to the dangerous spot (e.g. nip). Depending on this position, suitable reflection devices at the hands or arms are required. Since it usually has to be worked close to the protection area in manual operating functions, false shutdowns occur by the non-visible trigger area, which can considerably disturb the operating flow and result in material losses (examples: the product burns in tempered rolling mills, with still powdery additives, the product falls through with automatically opening nip).

Such false triggers are avoided by the integration of a line laser, which is oriented identically to the trigger area of the light curtain. By the projection of the line on the fingers, the hand and/or on the supply material, the operator sees at all times how far he is still away from the reflection element (e.g. reflection bracelet). Thereby, an unintended emergency shutdown with the corresponding consequences can be avoided. By this device, the protection area can be very exactly set and indicated. Thereby, a substantially improved and more easily operable safety system is achieved compared to currently known systems.

The function of the light curtain is optionally performed by examination of the individual sensors of the light curtain before start-up of the machine. This is manually or automatically effected by sweeping the sensors with a reflection unit.

The examination of the protection elements, i.e. of the reflection devices, at the hands or arms is important to use the protection elements correct and functional for the respective machine. In particular, this is required if different machines with different requirements are operated in the environment.

This examination is effected by two sensor devices positioned separated from each other, but reachable with each one hand. The reflection devices are for example provided with RFID transponders, which allow unique association. The sensor devices register the transponders and optionally examine the reflecting capacity or reflection of the reflection devices in addition or with an immediately adjacent further sensor device.

The registration of each application of the reflection devices is possible and a required exchange of the reflection devices after a maximum number of applications is definable. An additional integrated infrared transmitting and receiving cell secures the functionality by examination of the reflection. The examination at the two sensor devices effected at the same time secures the correct use of the protection elements at both hands/arms.

As a major field of employment, securing dangerous intervention locations of machines and plants like mixing rolling mills etc. can be regarded. However, with this approach, dangerous situations for machines and plants can also be monitored as well as protected independently of the personal protection. In particular, robot arms or other handling devices and conveyors, respectively, can also be examined and secured by these safety measures. Thereto, the dangerous situations have to be defined and indicated by this system.

The invention claimed is:

1. A safety device for a machine, the safety device comprising:
    a light curtain,
    a first and a second reflection device, which are each formed for reflecting light of the light curtain,
    a first identification element integrated in the first reflection device and a second identification element integrated in the second reflection device,
    a first sensor device for reading first identification information of the first identification element out of the first reflection device,
    a second sensor device for reading second identification information of the second identification element out of the second reflection device, and
    a control device for providing a start signal for the machine only if the first sensor device reads out the first identification information and the second sensor device reads out the second identification information at the same time and for providing a stop signal for the machine as soon as the light curtain detects its light reflected by one of the reflection devices.

2. The safety device according to claim 1, wherein the start signal is provided by the control device only if the first and the second identification information each correspond to preset reference information.

3. The safety device according to claim 1, wherein a line laser device is oriented parallel to the light curtain with its beam direction.

4. The safety device according to claim 1, wherein the first and the second reflection device are each formed for wearing at a limb of an operator of the machine.

5. The safety device according to claim 4, wherein the reflection devices are each formed as a glove, finger ring or bracelet.

6. The safety device according to claim 5, wherein each glove or each bracelet is respectively equipped with an expansion sensor, tension sensor, pulse tracker or vein detector, the signals of which are also a required condition for the control device in order that the start signal is provided.

7. The safety device according to claim 1, wherein the light curtain is realized with infrared light technology and the reflection devices are adapted thereto.

8. The safety device according to claim 1, wherein a third sensor device for examining a reflecting capacity of the first reflection device is arranged immediately next to the first sensor device and a fourth sensor device for examining a reflecting capacity of the second reflection device is arranged immediately next to the second sensor device.

9. The safety device according to claim 1, wherein the first sensor device, the second sensor device, the first identification element and the second identification element are based on RFID technology.

10. The safety device according to claim 1, wherein each detection event of the light curtain is countable by the control device and a corresponding counting result is taken into account in providing the start signal.

11. The safety device according to claim 1, wherein the safety device comprises a reflection element, which is movable into a beam path of the light curtain for examination purposes.

12. A machine with a safety device,
    the safety device comprising:
        a light curtain,
        a first and a second reflection device, which are each formed for reflecting light of the light curtain,
        a first identification element integrated in the first reflection device and a second identification element integrated in the second reflection device,
        a first sensor device for reading first identification information of the first identification element out of the first reflection device,
        a second sensor device for reading second identification information of the second identification element out of the second reflection device, and
        a control device for providing a start signal for the machine only if the first sensor device reads out the first identification information and the second sensor device reads out the second identification information at the same time and for providing a stop signal for the machine as soon as the light curtain detects its light reflected by one of the reflection devices;
    wherein a protection area of the machine is monitored by the light curtain.

13. The machine according to claim 12, wherein the first and the second sensor device are arranged at least 20 cm apart from each other.

14. The machine according to claim 12, wherein the protection area of the machine is indicated by a line laser with visible light on an operationally provided operator side.

15. The machine according to claim 12, which is formed as a rolling machine, punching machine, pressing machine or machine tool.

16. A method for operating a machine comprising:
    illuminating a border of a protection area of the machine with a light curtain,
    providing a first reflection device and a second reflection device, wherein a first identification element is integrated in the first reflection device and a second identification element is integrated in the second reflection device,
    reading first identification information of the first identification element out of the first reflection device by a first sensor device,
    reading second identification information of the second identification element out of the second reflection device by a second sensor device different from the first sensor device,
    detecting light of the light curtain after reflection on one of the reflection devices, and
    providing at least one of:
        a start signal for the machine only if reading out the first identification information and reading out the second identification information are effected at the same time, and
        a stop signal for the machine as soon as the detection of the light is effected.

* * * * *